United States Patent

[11] 3,568,021

| [72] | Inventor | Fred G. Turnbull<br>Scotia, N.Y. |
|---|---|---|
| [21] | Appl. No. | 824,757 |
| [22] | Filed | May 15, 1969 |
| [45] | Patented | Mar. 2, 1971 |
| [73] | Assignee | General Electric Company |

[54] LOW COST VARIABLE INPUT VOLTAGE INVERTER WITH RELIABLE COMMUTATION
11 Claims, 4 Drawing Figs.

[52] U.S. Cl................................................. 318/227,
321/4, 32/5, 321/45
[51] Int. Cl................................................. H02m 5/44,
H02m 7/52
[50] Field of Search................................................ 321/4, 5,
45, 45 (C); 318/227, 230, 231

[56] References Cited
UNITED STATES PATENTS

| 3,344,326 | 9/1967 | Risberg | 321/5X |
| 3,403,318 | 9/1968 | Krauthamer | 321/5 |
| 3,465,233 | 9/1969 | Johnston et al. | 321/45 |
| 3,474,320 | 10/1969 | Chandler | 321/5 |

FOREIGN PATENTS

| 1,151,469 | 5/1969 | Great Britain | 321/5 |

Primary Examiner—William H. Beha, Jr.
Attorneys—John F. Ahern, Paul A. Frank, Donald R. Campbell, Frank L. Neuhauser, Oscar B. Waddell and Joseph B. Forman ABSTRACT: A low cost, solid-state variable input voltage inverter recharges each commutating capacitor through an impedance and a controllable semiconductor switch, preferably a resistor and a transistor in series with a commutating capacitor, to the value of a source of fixed or predetermined voltage to assure reliable commutation over the entire range of input voltage control. The inverter is constructed in single and multiphase versions and is especially suited for industrial applications such as a wide range variable speed AC motor drive.

Inventor:
Fred G. Turnbull,
by Donald R. Campbell
His Attorney.

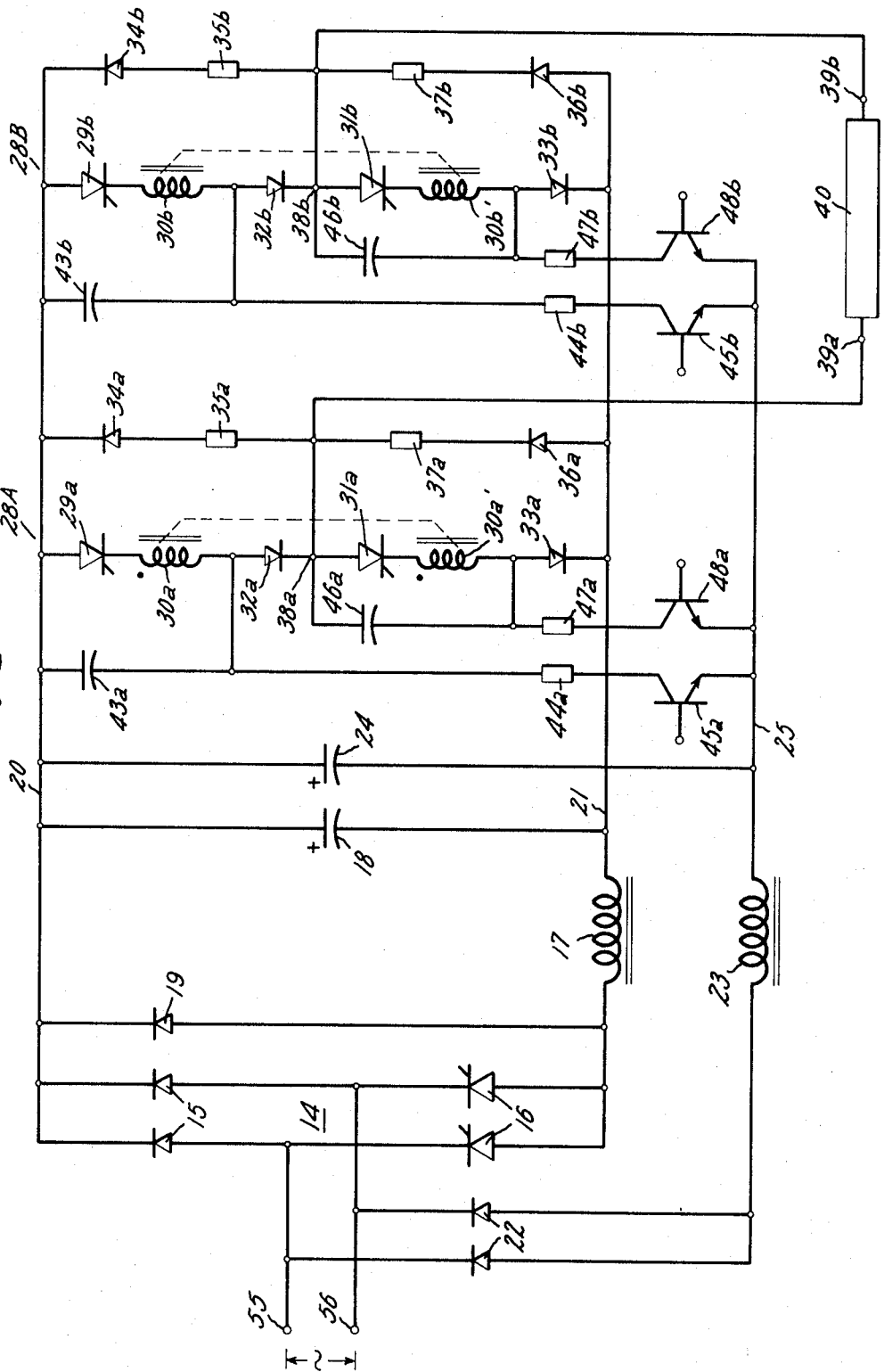

3,568,021

LOW COST VARIABLE INPUT VOLTAGE INVERTER WITH RELIABLE COMMUTATION

LOW COST VARIABLE INPUT VOLTAGE INVERTER WITH RELIABLE COMMUTATION

This invention relates to a low cost inverter that is supplied with a variable input voltage to obtain a wide range of output voltage, and more particularly to such an inverter in which reliable commutation for the thyristor load current carrying devices is achieved by recharging the commutating capacitors through an impedance and a controllable switching device to the fixed or predetermined value of a source of commutating capacitor recharging voltage.

One technique for obtaining a wide range inverter output voltage is to operate the inverter from a variable DC input supply. A variable input voltage inverter is desirable because it is possible to produce the wide range output voltage without an increase in harmonic content, and this type of inverter is commonly used in a variable speed alternating current motor drive wherein the magnitude and frequency of the voltage supplied to the motor are changed to vary the speed of the motor. A problem associated with an inverter having a variable DC supply, however, it that standard commutating circuits cannot be employed effectively to commutate or turn off the load current carrying thyristors. This is because in most standard inverters the commutating capacitors are charged to the DC supply voltage, or a value related to the DC supply, prior to commutation. As the DC supply voltage is reduced, the amount of available commutating energy is reduced correspondingly. This presents no problem for the standard inverter which uses a fixed DC supply voltage or one that varies over a narrow range. But with a variable input voltage inverter having a wide range of input voltage to produce a wide range of output voltage, it is seen that if a standard commutating circuit is designed for the maximum value of the DC supply, then there is insufficient commutating energy for the minimum DC supply voltage. If on the other hand the commutating circuit is designed for the minimum DC supply voltage, which may be near zero, then it is either oversized for the maximum supply or the ratings of the thyristors may be exceeded. Consequently, some other commutation technique is needed in which the available commutating energy is independent of the variable DC supply for the inverter.

Reliable commutation for a variable input voltage inverter has been achieved by utilizing an auxiliary inverter to generate commutating pulses for a transformer-coupled load inverter. The auxiliary inverter usually operates from a fixed DC supply, and thus generates commutating pulses of constant or predetermined magnitude, while the load inverter operates from a variable supply and delivers the varying output voltage. This inverter, while suitable for a wide speed range AC drive employing an induction motor, is too expensive for many industrial applications. Industrial applications typically require a wide range output voltage, variable frequency inverter having a fixed value of load current. The need for a fixed value of load current is particularly essential when the inverter is used to supply a constant torque, wide speed range AC motor drive. The constant torque AC motor is, of course, used to drive many industrial loads.

Accordingly, an object of the invention is to provide a solid-state, low cost variable input voltage inverter featuring an improved commutation circuit that produces reliable commutation over a wide range of output voltage.

Another object is the provision of a low cost inverter that is supplied from a variable DC voltage source, and includes commutating capacitor recharging circuits that are supplied from a fixed or predetermined DC voltage source and are arranged to recharge each commutating capacitor through an impedance and a controllable switching device to the fixed or predetermined voltage prior to commutation.

Yet another object is to provide a new and improved variable output voltage, variable frequency inverter that is especially suited for use in wide speed range AC motor drive for industrial applications.

The variable input voltage inverter comprises at least two load current carrying solid-state switching means, preferably gate controlled thyristors, connected in a series circuit between a first pair of variable voltage supply terminals. Gating means are provided for alternately rendering conductive the solid-state switching means, and also commutating means for respectively turning them off after desired intervals of conduction. The commutating means includes commutating inductor means and a commutating capacitor effectively coupled in parallel circuit relationship with each solid-state switching means. A point on the series circuit between the two solid-state switching means is an output terminal connectable to a load. In accordance with the invention, commutating capacitor recharging means is effectively coupled between a second pair of supply terminals preferably connected to a source of fixed voltage. The commutating capacitor recharging means comprises the series combination of an impedance and a controllable semiconductor switch, suitably a resistor and a transistor, connected in series circuit relationship with each commutating capacitor for respectively recharging the commutating capacitors prior to commutation to a predetermined voltage sufficient to reliable commutate its associated parallel-connected load current switching means over the entire range of variable input voltage. Gating means renders conductive each controllable semiconductor switch for a desired interval of conduction during intervals of nonconduction of the respective associated load current carrying solid-state switching means. Conveniently, the intervals of conduction of the controllable semiconductor switches and the solid-state switching means are coextensive, and a single gating circuit provides gating signals simultaneously to pairs of switches that operate together.

In one embodiment a three-phase inverter supplies variable output voltage to an alternating current motor in a variable speed AC drive system. In a second embodiment, a single phase bridge inverter supplies a resistive load.

The foregoing and other objects, features, and advantages of the invention will be apparent from the following more particular description of the preferred embodiments of the invention, as illustrated in the accompanying drawings wherein:

FIG. 3 is a single phase modification of the polyphase inverter of FIG. 1.

Figure 1:
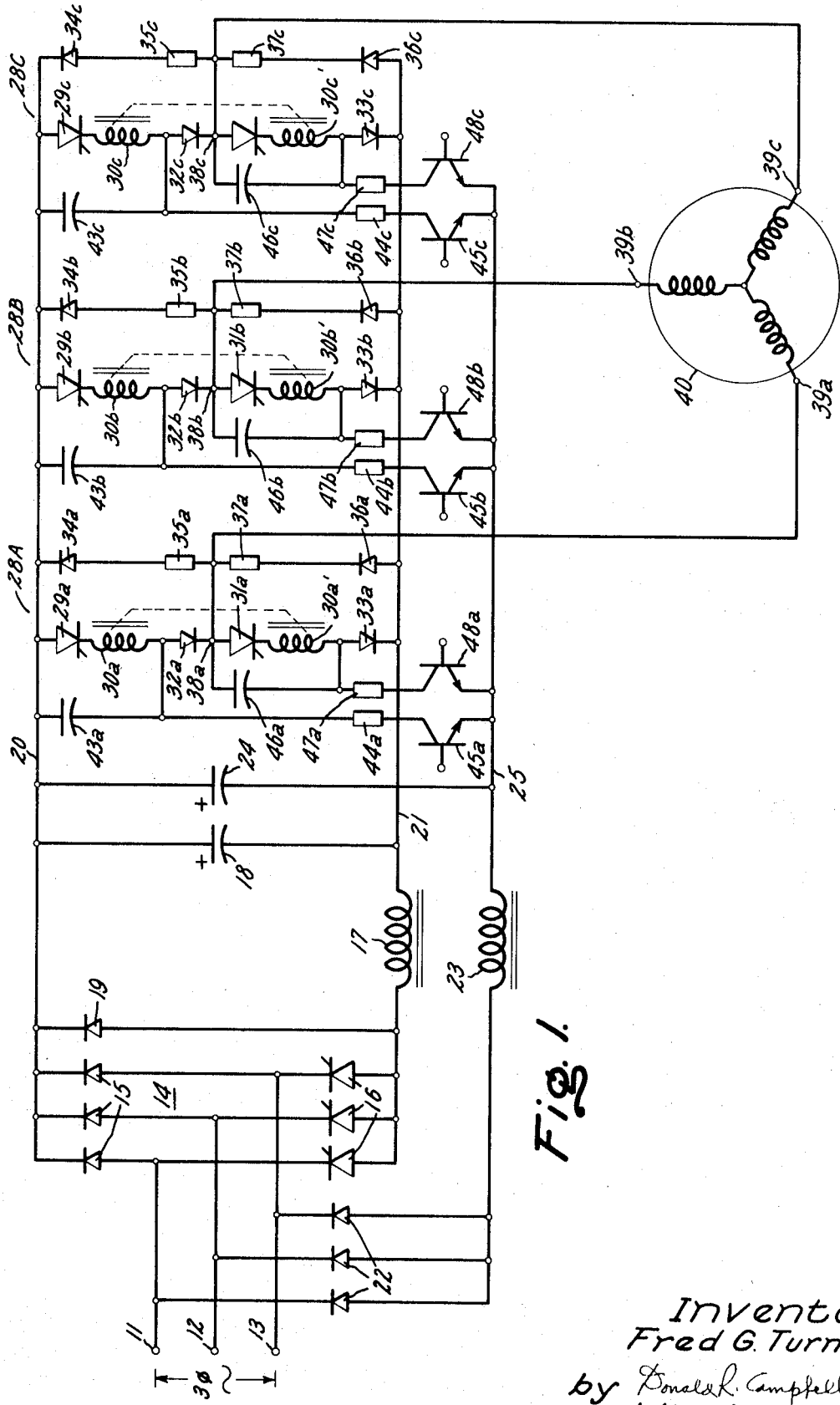
FIG. 1 is a schematic circuit diagram of a three-phase full wave bridge inverter constructed in accordance with the teaching of the invention that drives a variable speed three-phase alternating current motor.

The low cost variable DC input inverter for industrial applications constructed in accordance with the invention is suitable to derive its power from a commercially available source of single phase of polyphase alternating current potential. The input circuit or power supply section of the three-phase embodiment of the inverter circuit shown in FIG. 1 is adapted to be coupled across a three-phase source of electric potential typically having a value of 230 volts or 460 volts. Input terminals 11—13 are connected to a conventional phase controlled bridge type rectifier 14 comprising three diode rectifiers, indicated collectively by the numeral 15, and three controlled rectifiers, indicated by the numeral 16. The controlled rectifiers 16 more particularly are preferably gate controlled thyristors such as the silicon controlled rectifier. A suitable electrical filter is connected to the output terminals of phase controlled rectifier 14 for smoothing its output, and as illustrated comprises a series inductor 17 and a shunt capacitor 18. A coasting or freewheeling diode 19 is connected across the output terminals of the phase controlled rectifier 14 for circulating the trapped energy in the filter inductor 17 under appropriate conditions. Across the DC output terminals 20 and 21 of the power supply section there appears a variable voltage whose magnitude is dependent upon the length of conduction of the controlled rectifiers 16 in each respective half cycle of the alternating current supply. For a commercially available 240 volt source, the voltage across the variable voltage DC supply terminals 20 and 21, which are the input terminals for the three inverter phases, can be varied between a minimum of 0 volts and a maximum of about 300 volts.

As will be explained in greater detail later, the commutating capacitors in the commutating circuits for each phase of the inverter are recharged after each half cycle of operation from a fixed or predetermined source of commutating voltage. In keeping with the objective of a low cost inverter, the source of fixed or predetermined voltage is conveniently provided by a diode bridge rectifier, although a separate source such as a battery may also be used. Three of the diodes for the diode bridge rectifier are provided by the diodes 15 of the phase controlled rectifier 14, and three additional diodes identified collectively by the numeral 22 are connected in conventional manner to input terminals 11—13. A separate electrical filter comprising series filter inductor 23 and shunt capacitor 24 are connected across the output terminals of the fixed rectifier. Consequently, positive DC supply terminal 20 is common to both the source of variable input voltage for the load current carrying elements of the inverter and to the source of fixed input voltage for a portion of the commutating circuits of the inverter. The negative DC output terminal 25 of the source of fixed voltage, of course, is separate from the negative DC supply output terminal 21 of the variable source of voltage.

The embodiment of the variable input voltage supply inverter shown in FIG. 1 is a three-phase inverter in the full wave bridge configuration, and has three identical phases 28A, 28B, and 28C, each of which is essentially a single phase half-bridge inverter. Only the component elements of the half-bridge inverter 28A will be described, and some of the corresponding components in the other phase inverters will be indicated by corresponding numerals with a *b* or *c* suffix. The half-bridge inverter 28A comprises a load current carrying solid-state switching device 29a and a commutating inductor half 30a connected in series circuit relationship with a second load current carrying solid-state switching device 31a and the other commutating inductor half 30a', the series circuit so formed being connected between the variable DC supply terminals 20 and 21. To facilitate the operation of the new commutating circuit, this series circuit further comprises a blocking diode 32a connected between inductor half 30a and switching device 31a, and another blocking diode 33a in like manner connected between inductor half 30a' and the negative variable DC supply terminal 21. The inverter 28A is a square wave inverter of the type in which commutation of a conducting solid-state switching device is initiated by turning on the other solid-state switching device. The commutating inductors 30a and 30a', of course, are inductively coupled and can have a relatively small inductance value dependent on the turnoff times of the load current switching devices 29a and 31a. Although the commutating inductor is shown as having a core, it can if desired be an air core inductor.

The load current carrying solid-state switching devices 29a and 31a can each be a unidirectional conducting thyristor such as the silicon controlled rectifier, or a pair of transistors coupled together to have thyristor characteristics, or can be a bidirectional conducting thyristor such as the triac and diac, provided they are controlled to conduct current in only one direction, or can be some other suitable power semiconductor. It is preferred, however, that the solid-state switching devices 29a and 31a comprise gate controlled thyristors, and more particularly are silicon controlled rectifiers. As was mentioned, the silicon controlled rectifier is also known as a gate controlled thyristor and is a solid-state power device wherein, when the anode is positive with respect to the cathode, conduction through the device can be initiated by application of a gating signal to its gate electrode. Thereafter, however, the gating signal loses control over the conduction of current through the device, and in order to render it nonconductive or commutate it off, it is necessary to reduce the current through the device below the holding current or reverse bias the device by making the anode potential negative with respect to the cathode potential. The structure and characteristics of the silicon controlled rectifier and the other solid-state switching devices previously identified are described more completely in the Silicon Controlled Rectifier Manual, 4th Edition, published by the Semiconductor Products Department, General Electric Company, Syracuse, New York, copyright 1967.

The inverter 28A further includes feedback means comprising the series combination of a reversely poled feedback diode 34a and a resistor 35a connected across the series circuit comprising SCR 29a, commutating inductor half 30a, and blocking diode 32a. Feedback diode 34a and resistor 35a provide a path for reactive load current and a means for dissipating the trapped energy that remains in commutating inductor 30a at the end of the commutating interval. Although other techniques are available for dissipating the commutating energy, the use of a low cost resistor for this purpose is effective when the load current is not too high. In similar fashion, a second feedback diode 36a and energy dissipating resistor 37a are connected across the series circuit comprising the other SCR 31a, commutating inductor 30a', and blocking diode 33a. The junction point 38a between the two halves of inverter phase 28A is connected to an output terminal 39a, and inverter phases 28B and 28C respectively have corresponding output terminals 39b and 39c. The load 40 connected to these output terminals can in general be a unity power factor load or a nonunity power factor alternating current load. However, this low cost inverter is especially suitable for use in a variable speed AC drive to supply variable voltage, variable frequency power to an alternating current motor. Hence, the load 40 is illustrated as being an alternating current motor, preferably an induction motor operated to have constant torque characteristics so as to be useful in a variety of industrial applications. This circuit is most suitable for a low horsepower AC motor of 50 horsepower or less.

In addition to the commutating inductor 30a and blocking diode 32a, the new commutating circuit for SCR 29a includes a commutating capacitor 43a connected between the positive variable DC supply terminal 20 and the junction of commutating inductor 30a and blocking diode 32a, thereby being in parallel circuit relationship with SCR 29a and its associated commutating inductor. Commutating capacitor 43a is further connected in a commutating capacitor recharging circuit. For this purpose, capacitor 43a is connected in series circuit relationship with a current limiting resistor 44a and the collector-emitter load terminals of an NPN transistor 45a between the fixed DC supply terminals 20 and 25. As will be further explained later, transistor 45a is rendered conductive during the interval when load current carrying SCR 29a is in its nonconducting state, whereby commutating capacitor 43a recharges to the full value of the source of fixed voltage prior to another commutation. Since the voltage supplied by fixed DC supply terminals 20 and 25 is at least equal to, and usually greater than, the voltage supplied between variable DC supply terminals 20 and 21, it follows that the inverter circuit can commutate a constant value of maximum load current throughout its entire range of input voltage control. The commutating circuit for the other half of inverter 28A includes a commutating capacitor 46a connected to the junction point 38a across SCR 31a and commutating inductor 30a'. Commutating capacitor 46a is also connected in series with resistor 47a and the collector-emitter load terminals of an NPN transistor 48a, this series circuit being connected between junction point 38a and negative fixed DC supply terminal 25. In similar manner, transistor 48a is turned on during periods of nonconduction of SCR 31a, and recharges commutating capacitor 46a through resistor 47a to the value of the fixed voltage DC supply terminals 20 and 25.

Transistors 45a and 48a can be replaced by any suitable controllable semiconductor switch, such as a standard silicon controlled rectifier, a gate turnoff silicon controlled rectifier, or a silicon controlled switch. The last two devices, both controlled turnoff thyristors, are further described in the SCR Manual. Moreover, resistors 44a and 47a can be replaced by other appropriate impedance elements. When an inductor is used as the impedance elements, the commutating capacitors are resonantly charged to a predetermined voltage.

Figure 2A:
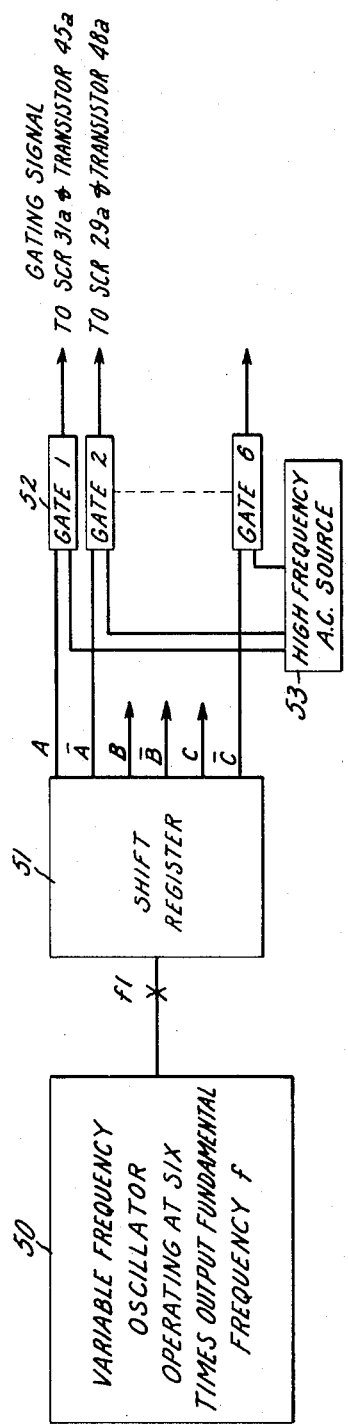
FIG. 2a is a block diagram of a gating circuit for supplying gating signals to the load current carrying gate controlled thyristors of the inverter circuit of FIG. 1.
Figure 2B:
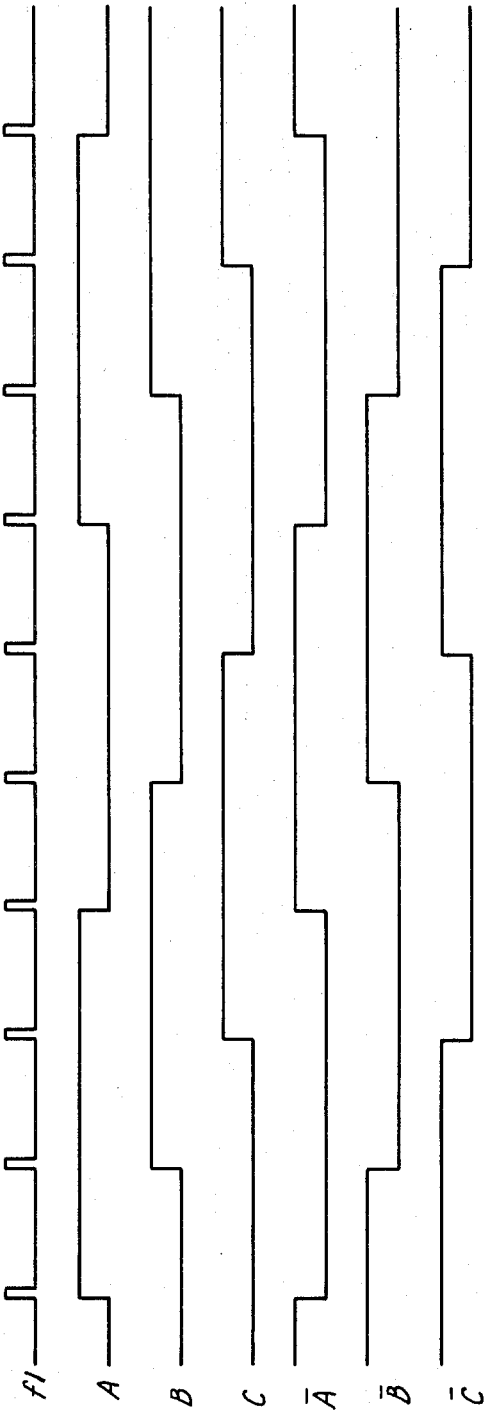
FIG. 2b is a series of waveform diagrams useful in explaining the operation of the gating circuit.

The operation of the inverter phase 28A will now be reviewed. The other two inverter phases 28B and 28C are operated in identical manner and appropriately phased with respect to one another to supply stepped wave three-phase power to the windings of alternating current motor 40 in a manner well known in the art. The manner of operation of the three-phase inverter for a resistive load is similar and likewise will not be described in detail. It will be assumed that gating signals from a gating source to be described subsequently with regard to FIGS. 2a and 2b are applied to the gate electrodes of SCRs 29a and 31a. These gating signals each have a duration of 180 electrical degrees and are phase displaced by 180°. It will further be assumed that SCR 29a is conducting load current from the positive variable DC supply terminal 20 through commutating inductor 30a and blocking diode 32a to motor 40, the return to the negative variable DC supply terminal 21 being through a conducting SCR in one of the other inverter phases. During this half cycle of operation commutating capacitor 46a is recharged to the full value of the fixed source of commutating voltage through transistor 48a and resistor 47a. At the beginning of the new half cycle of operation, the control signal to the base electrode of transistor 48a is removed, rendering it nonconductive, and at the same time a gating signal is applied to the gate electrode of SCR 31a to gate it into conduction. When SCR 31a conducts, the full voltage on the commutating capacitor 46a appears across the commutating inductor 30a'. Since the two halves of the commutating inductor are magnetically coupled together, the same voltage appears across the other commutating inductor half 30a with a polarity to reverse bias the then conducting SCR 29a, so that it begins to turn off. At this time commutating capacitor 43a is completely discharged. When SCR 29a returns to its nonconducting state, there is a path for reactive load current through resistor 37a and feedback diode 36a, which is now forward biased.

Charged commutating capacitor 46a in the meantime discharges through SCR 31a and commutating inductor 30a'. At the end of the commutating interval, the energy stored in commutating inductor 30a' is discharged in the closed path comprising diode 33a, feedback diode 36a, resistor 37a, and SCR 31a. This excess commutating energy is dissipated by resistor 37a, and when the current decays below the holding value of SCR 31a, it turns off. A gating signal is still being applied to SCR 31a, however, and when the reactive load current comes to an end and the load current reverses direction, an enabling potential is applied to SCR 31a and it is again rendered conductive to supply load current through commutating inductor 30a' and blocking diode 33a to the negative variable DC supply terminal 21. During this half cycle when SCR 31a is rendered conductive, turns off, and is rendered conductive again, transistor 45a is turned on to recharge commutating capacitor 43a through resistor 44a to the full value of the fixed DC source of voltage. When the voltage across recharging commutating capacitor 43a exceeds the voltage at the junction point 38a, blocking diode 32a is reverse biased, thereby allowing commutating capacitor 43a to be charged to a voltage above the variable load voltage. In the next half cycle of operation when SCR 29a is turned on to initiate the commutation of SCR 31a, transistor 45a in the commutating capacitor recharging circuits is turned off, and transistor 48a is rendered conductive to recharge commutating capacitor 46a through resistor 47a. The circuit to common supply terminal 20 is completed through diode 32a, commutating inductor 30a, and conducting SCR 29a. During this next half cycle of operation, blocking diode 33a is reverse biased when commutating capacitor 46a is charged to a voltage exceeding the load voltage.

Since the commutating capacitors recharge prior to another commutation to a fixed DC voltage having a value that exceeds or is at least equal to the maximum variable input voltage to the inverter, it is seen that the new inverter circuit commutates a constant value of maximum load current throughout its entire range of input voltage control. As has been pointed out, the need for a fixed value of load current is particularly essential when the inverter is used to supply a constant torque, wide speed range AC motor drive. It is within the scope of the invention, however, instead of recharging the commutating capacitors to a fixed voltage, to recharge the commutating capacitors 43a and 46a to a predetermined voltage that can vary within prescribed limits, depending on the value of load current to be commutated. Another advantage of the invention not heretofore mentioned is that by using the transistors 45a and 48a or other controlled semiconductor switches in the commutating capacitor recharging circuits, the power rating of the capacitor recharging resistors 44a and 47a is reduced by a considerable amount. This is because, of course, each controlled semiconductor switch is nonconductive for a full half cycle of the fundamental frequency of the inverter, during which interval the associated charging resistor is permitted to cool. The use of transistors 45a and 48a also reduces the interaction that exists between the two DC power supplies during the respective conduction intervals of SCRs 29a and 31a. To explain this further, it will be noted that with SCR 29a conducting and transistor 45a turned off, undesired flow of current through a sneak path from positive variable DC supply terminal 20 through SCR 29a, commutating inductor 30a, resistor 44a, and transistor 45a to the negative fixed DC supply terminal 25, is prevented. In the other half cycle when SCR 31a is conducting and transistor 48a is turned off, the undesired circuit that is blocked to prevent unwanted flow of current from the motor to negative fixed DC supply terminal 25 comprises the circuit from junction point 38a through SCR 31a, commutating inductor 30a', resistor 47a, and transistor 48a to negative supply terminal 25. Because these possible sneak current paths are closed, the circuit operates in a symmetrical manner at light load.

As has been explained, the preferred method of controlling half-bridge inverter phase 28A is to supply simultaneous gating signals to SCR 29a and transistor 48a continuously for a full half cycle of the operating frequency of the inverter phase, and then, 180 electrical degrees later, supply continuously applied gating signals to SCR 31a and transistor 45a for the other half cycle. The operating frequency, or the fundamental frequency as it will be called hereafter, varies with the input supply voltage to change the speed of motor 40 while maintaining constant flux in the machine. As the input supply voltage decreases, the fundamental frequency correspondingly decreases. While this is the simplest and most convenient manner of controlling the load current carrying switching devices and the commutating capacitor recharging circuit control switches, it will be recognized that it is only necessary that transistors 45a and 48a be conductive for a period sufficient to recharge the respective commutating capacitors to the fixed or predetermined voltage, and turn-on and turnoff of these switches need not coincide with the turn-on and turn-off of the load current carrying switching devices. Furthermore, in the case where gate controlled thyristors are used in the commutating capacitor or recharging circuits in place of transistors 45a and 48a, the gating signal need be applied only at the beginning of the desired interval of conduction. Although other gating circuit constructions are possible, the gating circuit technique illustrated in functional block diagram form in FIG. 2a operates to supply gating signals simultaneously to respective associated pairs of load current carrying switching devices and commutating capacitor recharging circuit control switches at appropriate intervals according to the preferred gating method wherein the intervals of conduction are coextensive, and is compatible with the objective of a low cost inverter. This gating circuit (FIG. 2a) is described more completely in an article by the inventor entitled "A Carrier Frequency Gating Circuit for Static Inverter, Converters, and cycloconverters," published in IEEE Transactions on Magnetics, Vol. MAG-2, No. 1, Mar. 1966, pages 14—17. The gating circuit illustrated is suitable for the three-phase inverter of FIG. 1.

Referring also to the series of waveform diagrams in FIG. 2b, a variable frequency oscillator 50 is provided that operates at six times the output fundamental frequency as determined by logic circuits not here shown. Oscillator 50 produces a train of pulses spaced apart 60 electrical degrees of the variable fundamental frequency $f$. The train of pulses at frequency $f_1$ are fed into a three stage shift register 51, and function as clock pulses to cause shift register 51 to shift at 60° intervals of the fundamental frequency. As is evident in FIG. 2b, the A, B, C outputs of shift register 51 are repeating square waves each 180° at an "on" potential and 180° at an "off" potential, the three square waves being phase displaced by 60°. Outputs $\overline{A}$, $\overline{B}$, $\overline{C}$ are respectively complementary square waves similarly phase displaced by 60°. A series of gates 1—6, identified by the common numeral 52, each has an input from a high frequency AC source 53 and from one of the outputs of shift register 51. High frequency source 53 has a frequency that is about 100—200 times higher than the maximum fundamental frequency, and facilitates fast response of the gating circuit. When gated on by the coincident signals from high frequency AC source 53 and shift register output A, gate 1 produces an isolated turn-on gating signal that is supplied to SCR 31a and transistor 45a. Gate 2 requires coincident signals from output $\overline{A}$ and high frequency source 53, and during the second half of the fundamental frequency cycle produces an isolated turn-on gating signal that is supplied to SCR 29a and transistor 48a. Gates 3 and 4 supply complementary gating signals at the appropriate times to the switching devices in inverter phase 28B, and gates 5 and 6 supply gating signals to inverter phase 28C.

FIG. 3 shows a single phase, full wave bridge version of the inverter circuit. Input terminals 55 and 56 are connectable across a commercially available single phase source of alternating current potential. The inverter includes two half-bridge inverters 28A and 28B having their output terminals 39a and 39b connected to a load 40 to operate in the full bridge circuit configuration. Load 40 in this case is illustrated as being a resistive load. It is believed that the operation of the single phase version of the inverter circuit is obvious to a person skilled in the art in view of the foregoing discussion, and need not be described further. While not here illustrated, the invention is applicable also to other suitable inverter circuit configurations.

In summary, a novel commutating capacitor recharging circuit is provided in a low cost, variable input voltage inverter to assure reliable commutation of a constant value of load current throughout the entire range of input voltage control. The commutating capacitors recharge to the value of a source of fixed or predetermined DC voltage through an impedance and a controllable semiconductor switch, preferably the series combination of a resistor and a transistor, in such manner that the power rating of the recharging resistor is reduced and that there are no undesired current paths between the variable voltage power supply and the fixed or predetermined voltage power supply. The inverter circuit operates symmetrically even at light load. Although the load can be any unity or nonunity power factor alternating current load, the inverter is especially suitable in a wide voltage, wide frequency range variable speed AC motor drive.

While the invention has been particularly shown and described with reference to several preferred embodiments thereof, it will be understood by those skilled in the art that the foregoing and other changes in form and details may be made therein without departing from the spirit and scope of the invention.

I claim:

1. In a variable input voltage inverter comprising at least two load current carrying solid-state switching means connected in a series circuit between a first pair of variable input voltage supply terminals, gating means for alternately rendering conductive said solid-state switching means, and commutating means for respectively turning off said solid-state switching means after desired intervals of conduction, wherein said commutating means includes commutating inductor means and a commutating capacitor effectively coupled in parallel circuit relationship with each of said solid-state switching means, a point on said series circuit between said solid-state switching means being an output terminal connectable to a load, the improvement which comprises:
   commutating capacitor recharging circuit means effectively coupled between a second pair of supply terminals;
   said commutating capacitor recharging circuit means comprising the series combination of an impedance and a controllable semiconductor switch connected in series circuit relationship with each of said commutating capacitors for recharging each commutating capacitor to a predetermined voltage sufficient to reliably commutate its associated parallel-connected load current carrying solid-state switching means over the entire range of variable input voltage;
   means for rendering conductive each controllable semiconductor switch for desired intervals of conduction during intervals of nonconduction of the respective aforementioned associated solid-state switching means; and
   further including rectifier means connected in said series circuit in series circuit relationship with each of said solid-state switching means and respectively operative to block when the voltage on the recharging commutating capacitor exceeds the voltage supplied to the load at said output terminal.

2. An inverter according to claim 1 wherein each impedance and controllable semiconductor switch in said commutating capacitor recharging circuit means comprises a resistor and a transistor.

3. An inverter according to claim 1 wherein the interval of conduction of each controllable semiconductor switch is coextensive with the interval of nonconduction of the respective associated load current carrying solid state switching means.

4. An inverter according to claim 3 wherein said gating means for said load current carrying solid-state switching means and said means for rendering conductive said controllable semiconductor switches is provided by a single gating circuit.

5. An inverter according to claim 1 wherein said first pair of variable voltage input supply terminals are connected to a source of variable unidirectional voltage comprising a solid-state phase controlled full wave bridge rectifier and an electrical filter, and said second pair of supply terminals are connected to a source of fixed unidirectional voltage comprising a solid-state fixed output full wave bridge rectifier and an electrical filter;
   said phase controlled and fixed output bridge rectifiers having common components so that one of the supply terminals in each pair is common.

6. A variable input voltage inverter comprising:
   a load current carrying series circuit connected between a pair of variable input voltage supply terminals comprised by a first gate controlled thyristor, a first commutating inductor, a first blocking diode, a second gate controlled thyristor, a second commutating inductor, and a second blocking diode, said commutating inductors being inductively coupled, the junction between said first blocking diode and second gate controlled thyristor being an output terminal connectable to a load;
   feedback means for circulating reactive load current and excess commutating energy;
   first and second commutating capacitors respectively connected in parallel circuit relationship with said first gate controlled thyristor and commutating inductor, and said second gate controlled thyristor and commutating inductor;

first and second commutating capacitor recharging circuits each effectively coupled between a pair of fixed voltage supply terminals, said first commutating capacitor voltage supply terminals, said first commutating capacitor recharging circuit comprising the series combination of an impedance and a first controllable semiconductor switch connected in series with said first commutating capacitor, said second commutating capacitor recharging circuit comprising the series combination of an impedance and a second controllable semiconductor switch connected in series with said second commutating capacitor; and gating circuit means for simultaneously rendering conductive said first gate controlled thyristor and second controllable semiconductor switch, and for alternately and simultaneously rendering conductive said second gate controlled thyristor and first controllable semiconductor switch;

whereby the commutating capacitors are recharged prior to commutation to the value of the fixed voltage appearing in said second pair of fixed voltage supply terminals and reliable commutate said gate controlled thyristors over the entire range of variable input voltage.

7. An inverter according to claim 6 wherein the impedances and controllable semiconductor switches in said commutating capacitor recharging circuits comprise resistors and transistors.

8. An inverter according to claim 6 wherein said variable voltage and fixed voltage supply terminals have a common terminal, and said first commutating capacitor recharging circuit is connected between said common terminal and the other fixed voltage supply terminal, and said second commutating capacitor recharging circuit is connected between said output terminal and the other fixed voltage supply terminal.

9. A three-phase inverter including three of the inverters as defined in claim 6 connected between common pairs of variable and fixed voltage supply terminals, and an alternating current motor connected across the output terminals of the three inverters.

10. A single phase inverter including two of the inverter circuits as defined in claim 6 connected between a single pair of variable and fixed voltage supply terminals, and an alternating current load connected between the output terminals of the two inverter circuits.

11. In a variable input voltage inverter comprising at least two load current solid-state switching devices connected in a series circuit between a first pair of variable input voltage supply terminals, gating means for alternately rendering conductive said solid-state switching devices for the conduction of load current, and commutating means for respectively turning off said solid-state switching devices after desired intervals of conduction, wherein said commutating means includes commutating inductor means and also includes commutating capacitors each effectively coupled in parallel circuit relationship with a respective one of said solid-state switching devices, a point on said series circuit between said solid-state switching devices being an output terminal connectable to a load, the improvement which comprises:

a pair of independent commutation capacitor recharging circuits effectively coupled between a second pair of supply terminals;

each commutation capacitor recharging circuit comprising the series combination of a resistor and a controllable semiconductor switch connected in series circuit relationship with a respective one of said commutating capacitors for recharging each commutating capacitor to a predetermined voltage sufficient to reliably commutate its associated parallel-connected load current switching device over the entire range of variable input voltage; and means for rendering conductive each controllable semiconductor switch only during intervals of nonconduction of the respective associated load current switching device.